United States Patent [19]

Ackeret

[11] 4,242,820
[45] Jan. 6, 1981

[54] CONTAINER FOR PHOTOGRAPHIC PRINTS

[75] Inventor: Peter Ackeret, Küsnacht, Switzerland

[73] Assignee: Licinvest AG, Chur, Switzerland

[21] Appl. No.: 943,367

[22] Filed: Sep. 18, 1978

[30] Foreign Application Priority Data

Sep. 20, 1977 [DE] Fed. Rep. of Germany ....... 2742347

[51] Int. Cl.³ .............................................. G09F 11/30
[52] U.S. Cl. ........................................ 40/513; 40/490; 40/511
[58] Field of Search ................ 40/513, 511, 509, 508, 40/490, 375, 381, 380

[56] References Cited

U.S. PATENT DOCUMENTS

| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |

Primary Examiner—John F. Pitrelli
Attorney, Agent, or Firm—H. Dale Palmatier

[57] ABSTRACT

A container for confining a pile of pictures and displaying one of the pictures, a housing with a movable part facilitating removal and insertion of pictures, a viewing window, a backing device with a portion engaging and urging the pile of prints toward the window, and a movable spring or latch to hold the backing device against the displayed print, said backing device being released upon actuation of said movable part.

21 Claims, 34 Drawing Figures

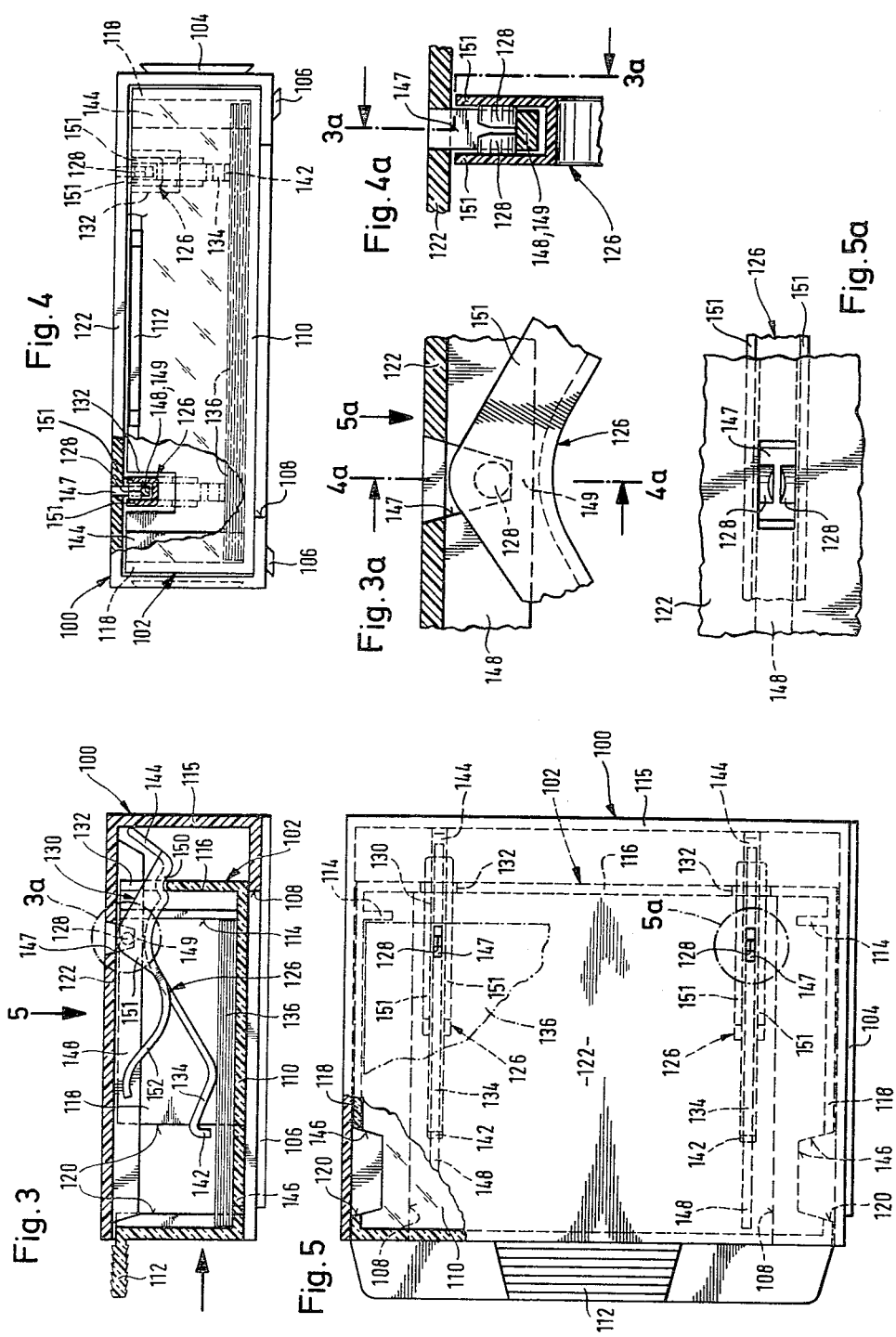

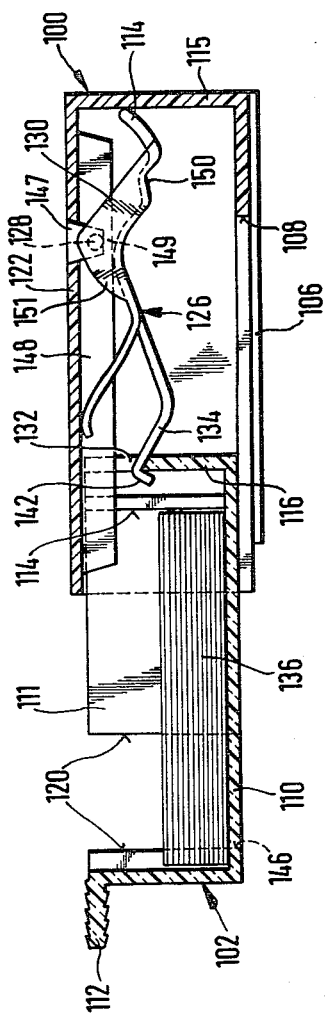

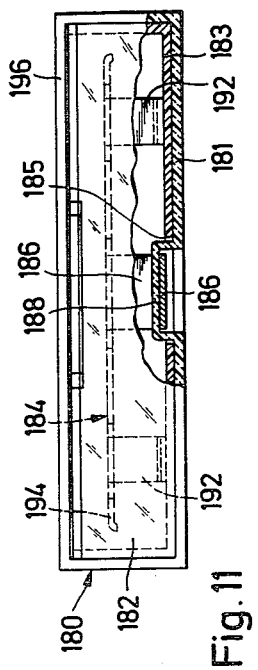
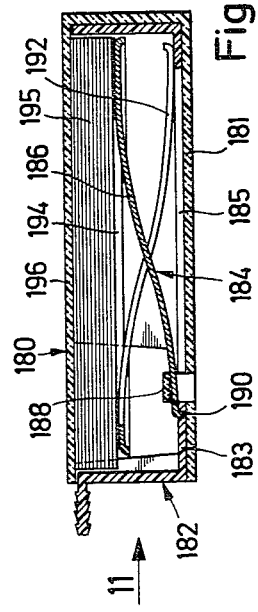
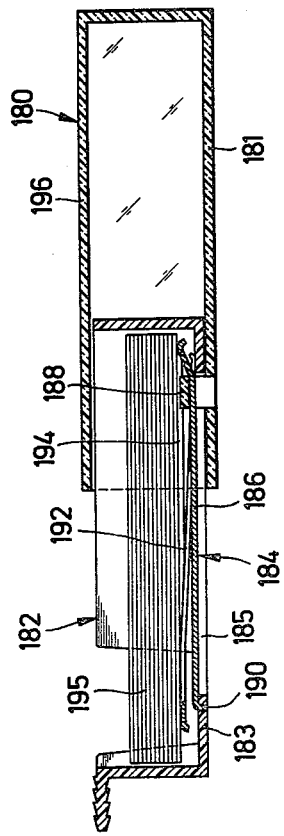
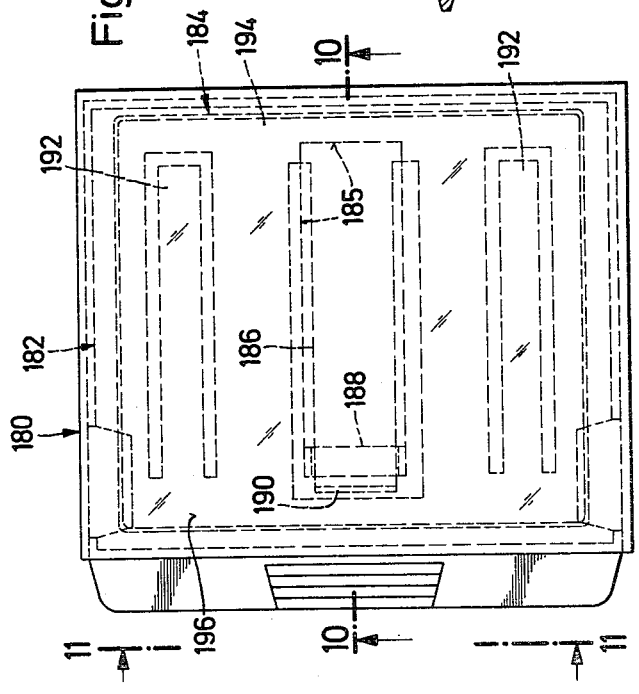

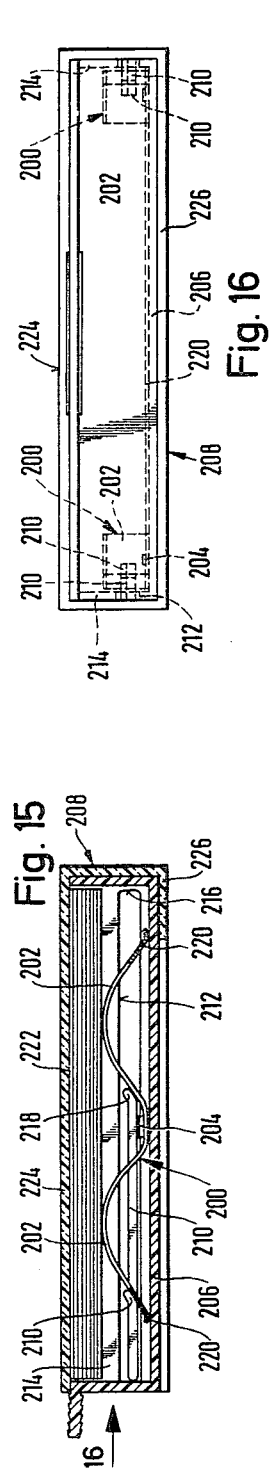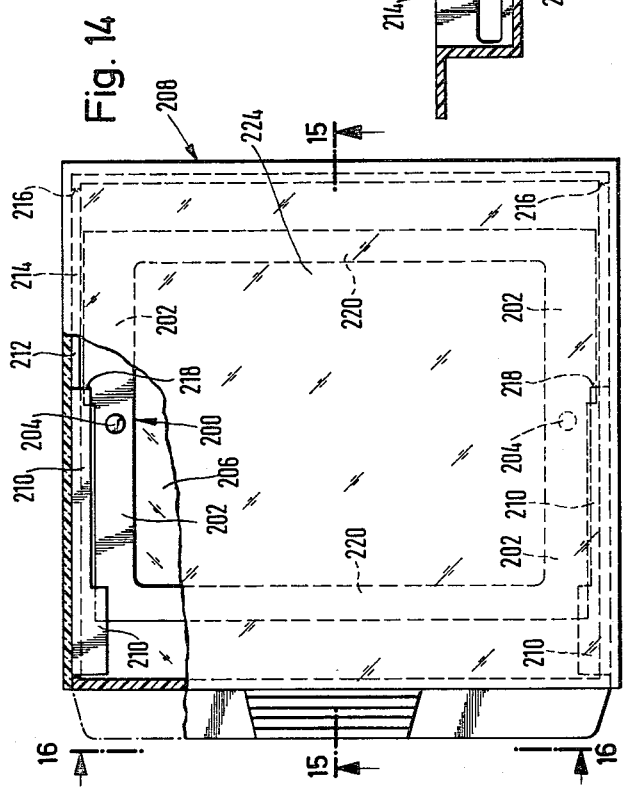

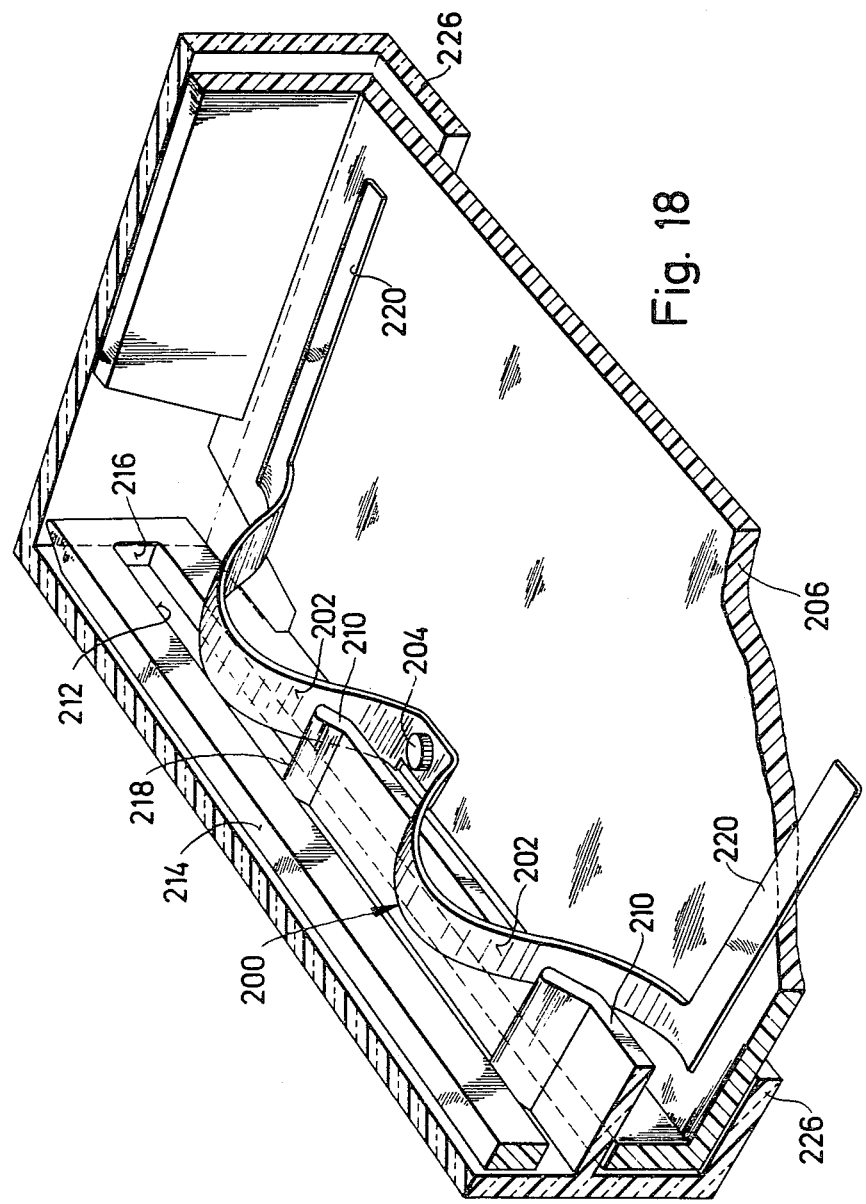

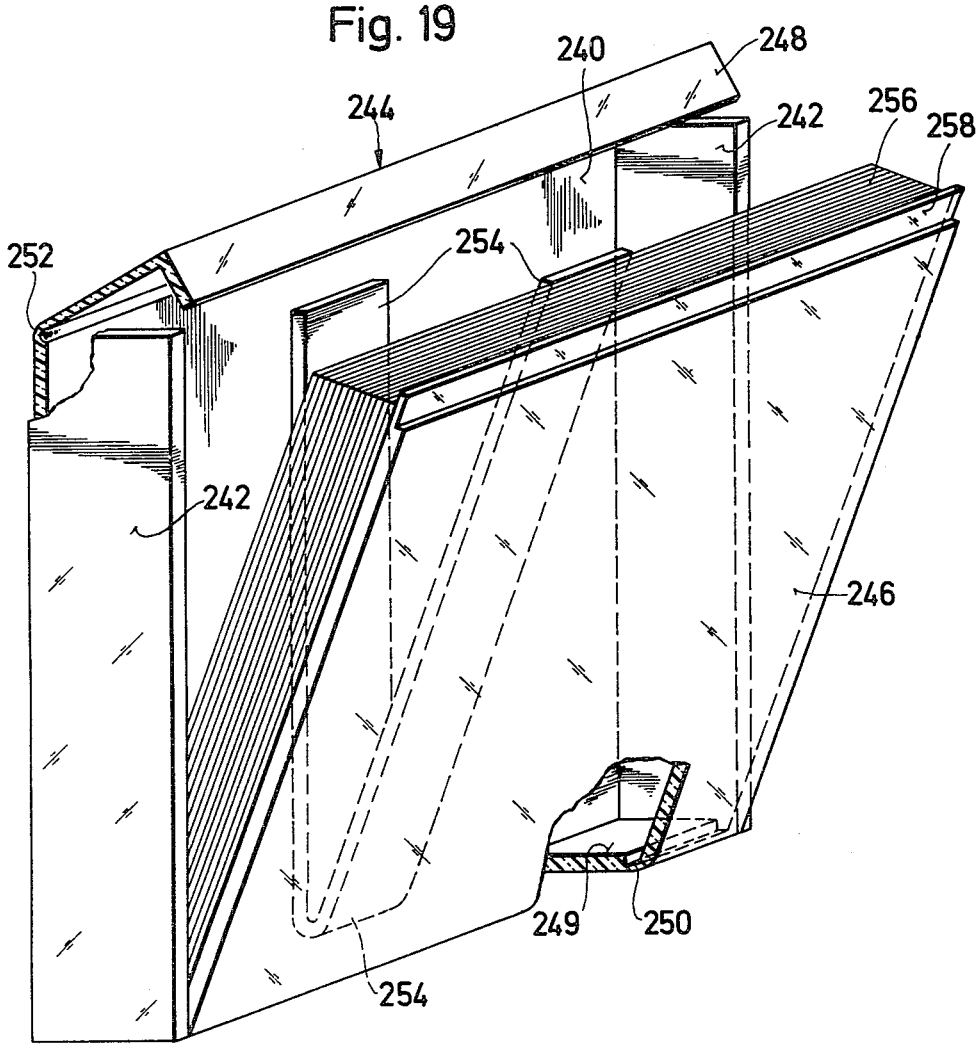

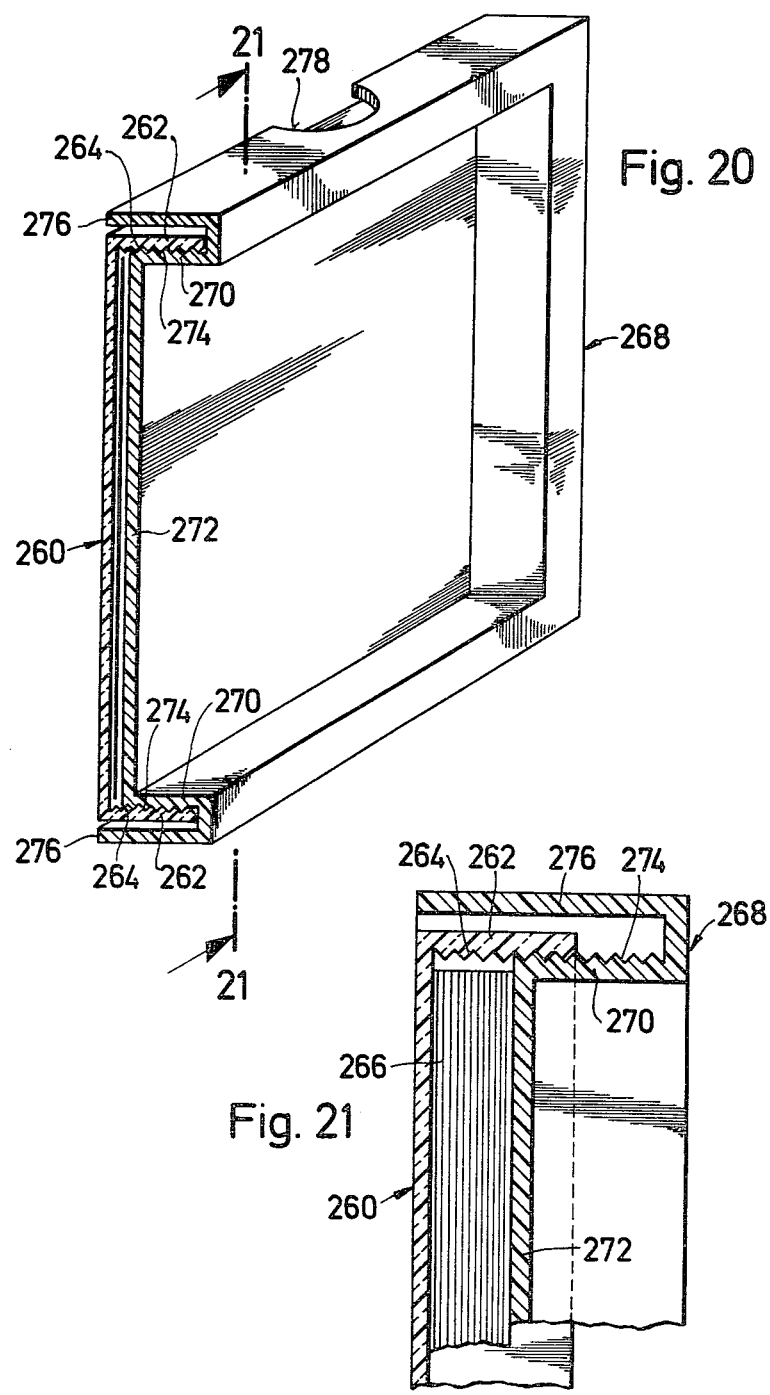

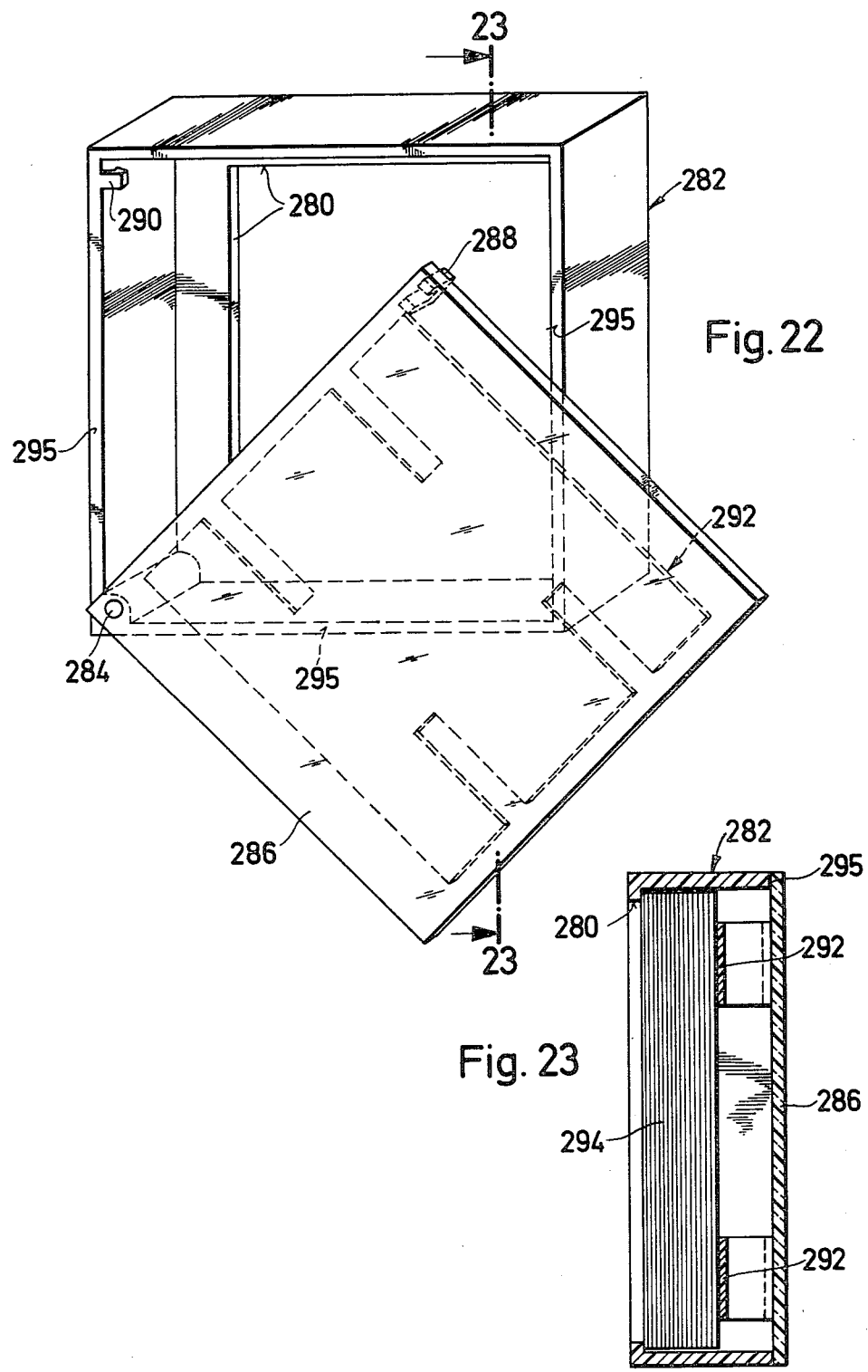

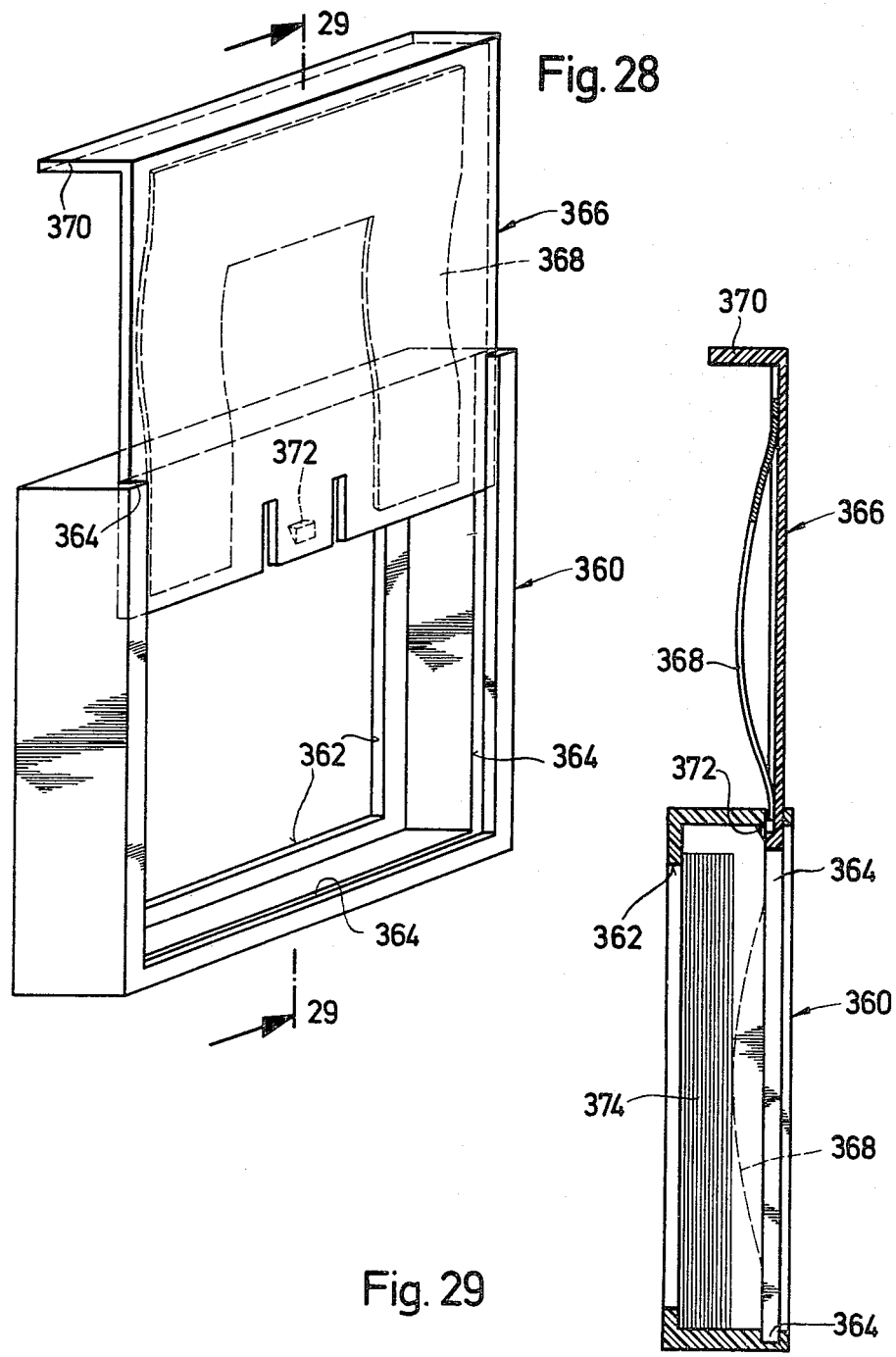

CONTAINER FOR PHOTOGRAPHIC PRINTS

The invention relates to a container for photographic prints of the same format.

BACKGROUND OF THE INVENTION

As is known, at present photographic positives are produced almost only in one width, that is 90 mm, and in three lengths 90, 115, 130 mm. The owner stores the positives in loose form or glues them into a photgraph album. The former is extremely unsatifactory owing to the unavoidable disarrangement, and the latter is troublesome and involves a lot of work and the price of photograph albums means a not inconsiderable increase in the total price of a "photograph library." The printing firms send the prints to photographic shops, chemists, etc. in paper bags or cardboard envelopes in which the prints are exposed to damage as a result of bending, knocking, etc.

SUMMARY OF THE INVENTION

The problem of the invention is to create a container for photographic prints (positives) which is suitable both for dispatching photographs, for example from printing firms, and for storing the same and which furthermore can be so designed that an aesthetically attractive photograph library can be constructed from several similar containers and that finally an individual container can also form a useful hanging frame or stand-up frame.

This problem is solved by the features given in the main claim. Each container has space for a certain maximum number of prints, preferably corresponding to the number of negatives per nagative film, and one print is visible from the outside, the container acting as a frame. It is therefore not possible to see from the outside whether the container is completely or only partially filled or whether it contains only the picture behind the viewing window. A number of individual containers of the same or, if desired, also different format, may be combined to form a compact unit which can be conveniently stored. To change a pile of photographs, when the container is opened all of the photographs, including the one closely adjacent to the window, can easily be removed.

With clever design the container can be produced at a price far below that of an album of the same capacity, and not only saves the user a substantial amount of space but has the additional advantage that it involves practically no work: with careful selection of the photograph visible in the window as characteristic of the contents of the container even the small effort of labelling the contents is saved.

If desired, however, the container is also flat enough to be used as a hanging frame or stand-up frame.

The containers shown in the drawings, which for reasons concerning cost consist of plastics material, have special features which are defined in the subclaims.

BRIEF DESCRIPTION OF THE DRAWINGS

Embodiments of the object of the invention are explained in detail in the following with reference to the accompanying drawings:

FIGS. 1 to 6 show a first embodiment in which FIG. 1 is a perspective view of a single container, FIG. 2 shows four containers joined together, FIG. 3 is a section view parallel to a side wall of the container, FIG. 3a is an enlarged detail of the portion of FIG. 3 bounded by circle 3a; FIG. 4 is a left side elevation view as viewed at 4 in FIG. 3, with a portion broken away and shown in detail; FIG. 4a is a detail section view taken at 4a—4a of FIG. 3a; FIG. 5 is a plan view of the container with portions broken away; FIG. 5a is an enlarged detail plan of the area of FIG. 5 bounded by circle 5a; and FIG. 6 is a section similar to FIG. 3 but at a different stage of operation;

FIGS. 9 to 13 show a third embodiment, with a perspective view in FIG. 9, wherein the housing is broken away; FIG. 10 is a section view at 10—10 of FIGS. 9 and and 12; FIG. 11 is an elevation view partly broken away as seen at 11—11 in FIGS. 9 and 12; FIG. 12 is a plan view, and FIG. 13 is a section view like FIG. 10 but with the slider drawn out;

FIGS. 14–18 show a fourth embodiment; FIG. 14 is a top plan view, partly broken away; FIG. 15 is a section view along the lines 15—15 in FIG. 14; FIG. 16 is an elevation view as seen at 16—16 in FIG. 14, 15; FIG. 17 is a similar view to that in FIG. 15 but with the slide member drawn out, and FIG. 18 is a detail in perspective and broken away for clarity of detail;

FIG. 19 is a perspective view, partly broken away, of a fifth embodiment;

FIGS. 20 and 21 show a sixth embodiment; FIG. 20 is a perspective view broken away and FIG. 21 is a sectional view, broken away, as viewed at 21—21 of FIG. 20;

FIGS. 22 and 23 are a seventh embodiment wherein FIG. 22 is a perspective view and in section and FIG. 23 is a detail section, with the cover closed as viewed at 23—23 of FIG. 22;

FIG. 27 is a schematicised inside view in outline as seen at 27—27 of FIG. 26;

FIGS. 28 and 29 relate to a tenth embodiment with a perspective view in FIG. 28 and a longitudinal section in FIG. 29 as seen at 29—29 of FIG. 28;

DETAILED SPECIFICATION

Figure 1:
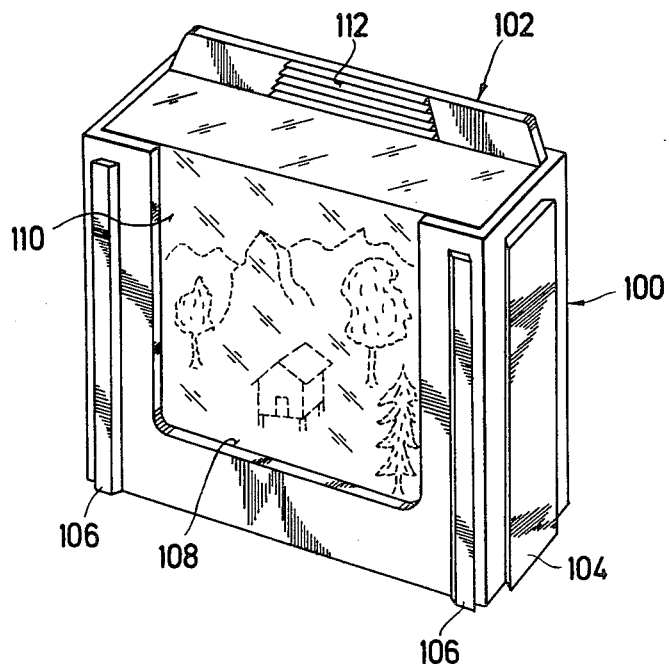

FIGS. 1-6 relate to a first embodiment. A single container comprises an outer housing 100 and a slider member 102. Provided on the outer housing are connecting rails or dovetail inserts 104, 106 and on the sides in each case lying opposite the rails, dovetail grooves 99 that are complementary in shape to the rails. Each housing 100 has on one of its large faces a viewing aperture 108, and since the slider member 102 is transparent at least in the region of its face 110 facing the viewing aperture, it is possible to see a photograph lying therebeneath through the viewing aperture 108.

Figure 2:
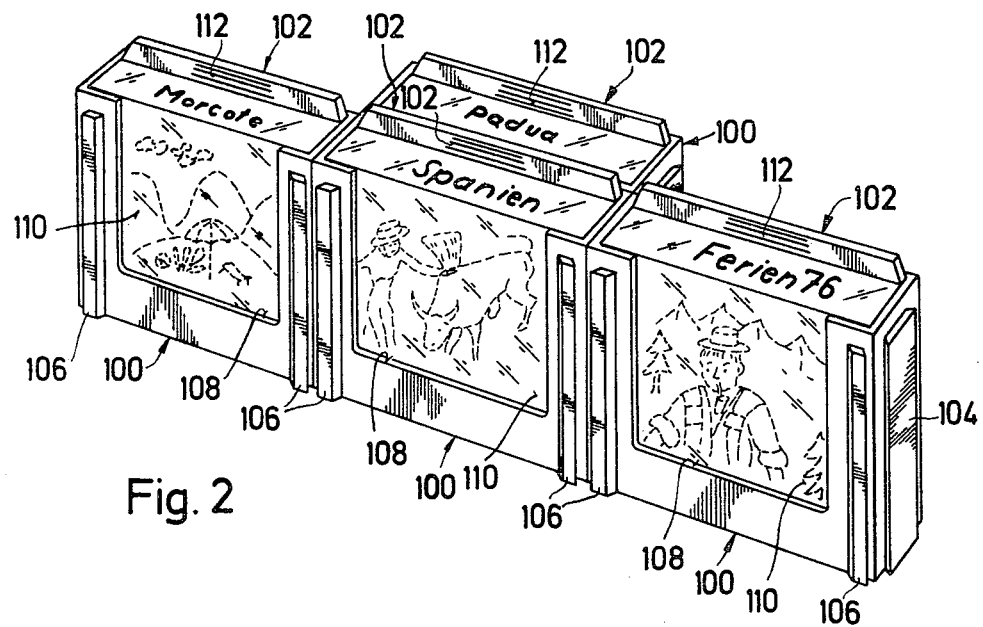

FIG. 2 shows the expert how the individual containers can be joined to form stacked blocks, so that a photograph library can be constructed.

FIGS. 3-6 show the inside construction of the container. The slider member, made of transparent plastics material, is constructed in the form of a drawer, with an operating pull 112 and a double rear wall 114, 116 lying opposite the pull. The side walls 118 of the slider member have cut away portions 120, which simplify the insertion and removal of the pile of photographs.

Inwardly projecting guide rails 148 are formed on the rear wall 122 of the housing 100 lying opposite the viewing aperture 108. A bearing recess 147 in rail 148 and wall 122 cooperates with the bridging portion 149 of rail 148 to receive and retain pins 128 of pressure levers 126. Pins 128 are formed integrally of upstanding ribs 151 which embrace rail 148 after pins 128 are snapped into the bearing recess 147. The levers 126 lie in the closed state (FIG. 3) on the one hand with their lower arm 130 in a recess 132 in the rear wall 116 of the slider member and consequently press with their resilient arm 134 on a pile 136 of inserted photographs, so that the lowermost is visible through the transparent base plate 110 of the slider member and the viewing aperture 108 of the housing.

Formed on the free end of the lever arm 134 is a hook 142 which when the drawer is drawn out rests in the recess 132 in the rear 116 of the slider member and thus prevents the drawer from being pulled out completely. The other free arm 130 of the lever is likewise provided at its rear side with a resilient portion 144 and thus makes the stop 142/116 non-rigid. The inner rear wall 114 of the slider member acts as a bearing surface for the inserted photographs 136. The removal cut away portions 120 in the side walls 118 of the slider member extend into the base plate 110 at 146, but end before the lateral edge of the window 108, and portions 120 extend inwardly of the edges of the photos, defined by stops on walls 114.

When the slider member is pushed in (FIG. 3) the pile of photographs 136 is thus held adjacent to the base plate 110, different pile heights being compensated by the resilient property of the arm 134 of lever 126. When the slider member is opened, the same lever acts as a stop against unintentional removal of the slider member.

Housing and slider member are injection-molded in one piece from plastics material and, as can be seen, can easily be removed from the molds; wobbling of the slider member is prevented on the one hand by the guiding of the slider member side walls 118 in the housing and on the other hand by additional guide rails 148 shaped on the housing. The levers 126 are simple stamped or bent members of sheet metal or are likewise injection-molded plastic parts. FIG. 5 shows that the levers can be, for example, snapped in the bearing recess 147. An indentation 150 on the underside of the lever arm 130 rests, in the closed position shown in FIG. 3, against the upper edges of the wall adjacent recesses 132 and thus arrests the slider member.

FIGS. 3a, 4a and 5a permit to recognize more clearly the design of lever 126 at its bearing portion. The bearing ear 147 is simply an incision in the bars 148 apt to serve as a bearing, the symmetric journal pins 128 being snapped-in under elastic deformation of the thin and therefore very resilient webs 151 of lever 126. The pins will then rest on the small bridge 149 which remains. Optionally, an auxiliary spring 152 may be provided.

Figure 7:
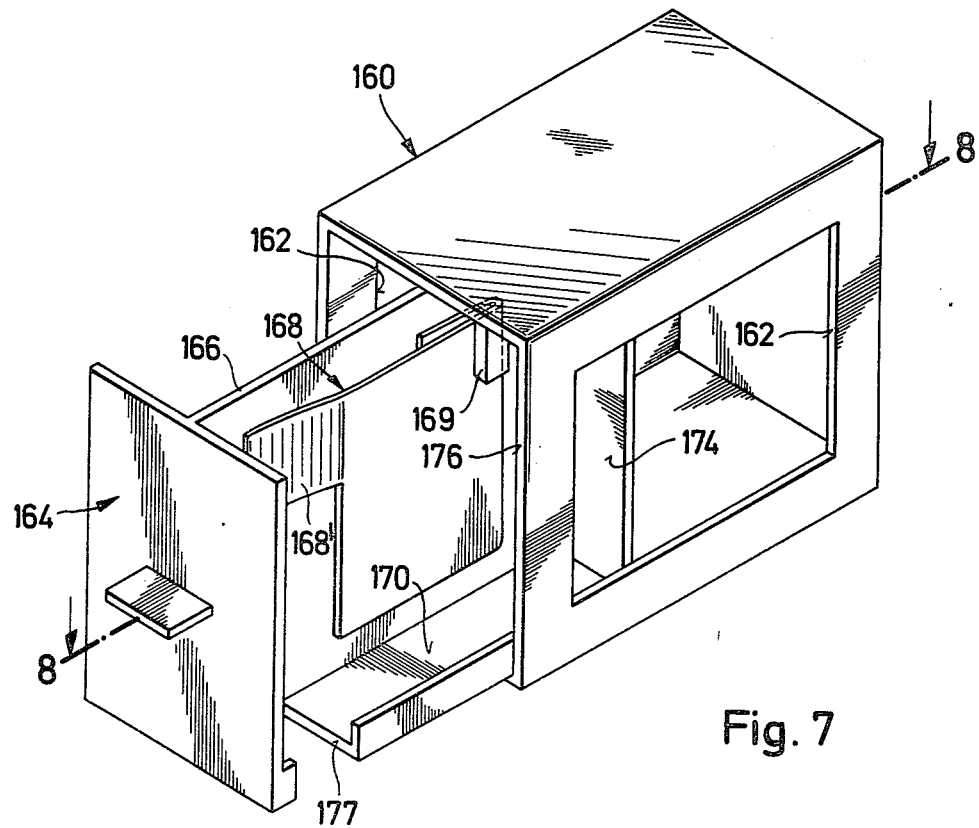
FIGS. 7 and 8 show a second embodiment, in perspective in FIG. 7, and in which is a somewhat diagrammatic section view at 8—8 of FIG. 7 and illustrating the inside of the container with half of the slider diagrammatically drawn out and the other half of the slider being shown within the housing, and in FIG. 8 closed at the left and open at the right.
Figure 8:
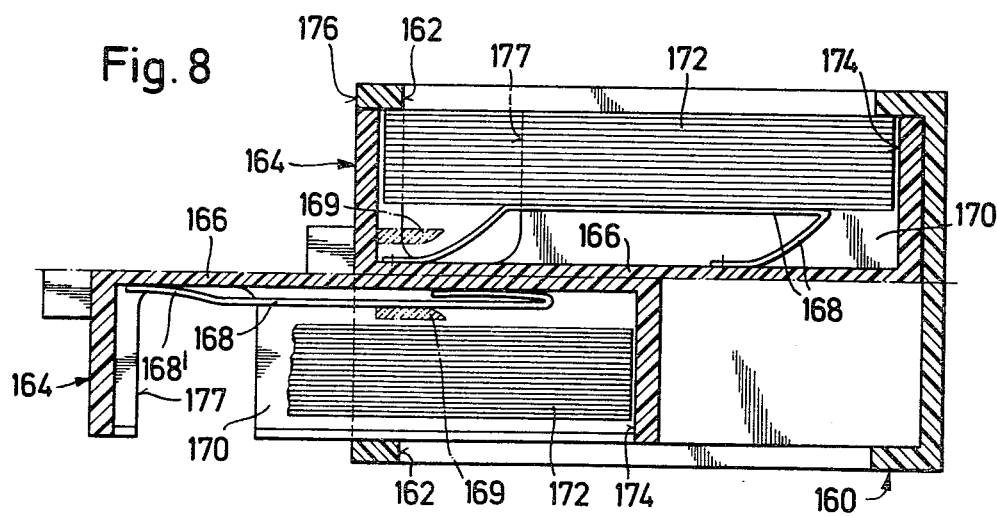
Figure 9:
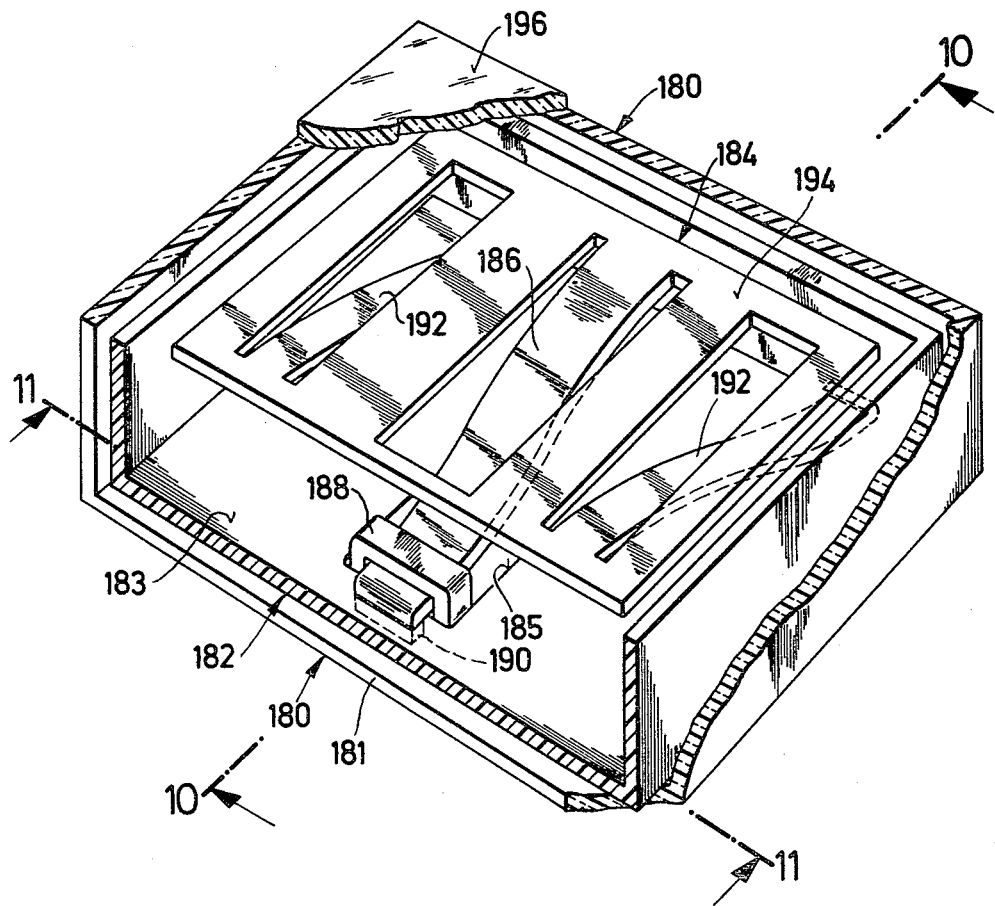

The embodiment according to FIGS. 7 and 8 comprises a housing 160 with two viewing windows 162 and a common closure 164 in the form of a slider member that can be pulled out. The slider member has a middle wall 166 which lies centrally between the two windows 162 and parallel to them, which middle wall carries a spring pressure arrangement 168 on each side. Photographic prints 172 stand on the base 170 of the slider member on both sides of the middle wall 166.

Adjacent closure 164, slider bottom 170 is provided with indentations 177 facilitating insertion and removal of photos.

From the top wall and adjacent the front edge 176, a stop lug 169 depends. With the slider pushed home, this lug does not have any function. Upon the slider being pulled outward, the inclined face 168' of the pressure arrangement engages lug 169 so that the spring is urged against central wall 166 and the pile of photo prints become loose. Further, lug 169 serves as a stop limiting the stroke of the slider when rear wall 174 abuts it.

The embodiment according to FIGS. 9-13 is also convenient. The whole housing 180 consists here of transparent plastics material and the slider member 182, which can be pulled out, may but does not have to consist of the same material. An integral leaf spring 184 can best be seen in FIG. 9. It extends with a central arm 186 through a bridge 188, injection-molded onto the base 181 of the housing, and is arrested by a hook-like bent portion 190 in the bottom 183 of the slider member. Lateral arms 192, curved downwards from the opposite ends and an upper pressure plate 194 complete the spring. In the case of a housing made of opaque plastics material a window portion, closed if desired by a transparent plate, is to be provided.

On pulling out of the slider member, the bridge 188 presses on the central spring arm 186 and thereby draws the whole spring downwards (cf. FIG. 13), so that the spring arrangement is disabled when the slider member is pulled out. On returning the slider member the piled photographs 195 are then pressed upwards against the transparent front side 196 of the housing. Slider bottom 183 is provided with a slot 185 through which the bridge 188 extends, serving so as to guide means for the slider member.

Other details, such as removal cut-away portions in the slider member, etc., have already been described above with reference to FIGS. 1-6 and are also in the same form here.

The embodiment according to FIGS. 14-18 also has a pressure spring arrangement 200 having two bowed portions 202 attached centrally at 204 to the base 206 of the slider member. Formed on the housing 208 there are lateral control projections 210 which project into the inside of the slider member and lap over the bowed portions 202 of the spring arrangement 200. On pulling out the slider member the bowed portions 202 slide under the projections 210 and in so doing are pressed downwards (cf. FIG. 17). The rear end 216 of the slot 212 finally comes to rest against the facing end 218 of the innermost projection 210 and is stopped there. The side walls 214 can flex inwards and therefore may be pushed over the projections 210 during assembly, after which the slot trips into position. The spring arrangement 200 is completed by transverse arms 220 which connect the bowed portions 202 arranged on both sides. When the slider member is pushed in, therefore, the uppermost picture 222 of an inserted pile is pressed against the transparent front plate 224 of the housing 208. In order to save material, the base 226 lying opposite the cover plate 224 is cut away.

The first four embodiments so far described all have an outer housing and a slider member with which the inserted photographic prints are conveyed into or out of the housing.

It is also possible, of course, to provide the container with a hinged lid and such embodiments are described below.

The embodiment according to FIG. 19 comprises an integral injection-molded plastics part. The injection-molded part comprises a container rear wall 240, two container side walls 242, a narrow lid 244 and a large lid 246. A front lip 248 is also injection-molded onto the narrow lid 244. At the joint between the lid 246 and a base portion 249, which is joined to the rear wall 240 and to the side portions 242, a weak strip 250 is injection-molded to form a hinge and a hinge of the same construction is provided at 252 between the rear wall 240 and the narrow lid 244. A sheet metal or plastics spring 254, supported at the rear wall 240, is placed or glued into the container or is produced from the rear wall 240. When the large lid 246 is open a pile of photographs 256 can be inserted which, when the lid 246 is pressed between the side portions 242, is pressed against the inside of the transparent lid 246 by the spring 254. The large lid 246 is held in this position by the lip 248 of the narrow lid 244 which engages over the free edge of the lid 246 in a notch 258 provided therein and locks by friction. The large lid 246 may also have a cut-out window portion, in which case the whole container may be injection-moulded from opaque plastics material, it being possible to seal the window aperture again, if desired, by inserting a plate. These possibilities also exist for almost all the embodiments so far described and also for the embodiments described below. Likewise, the spring arrangements for pressing the pile of photographs may also consist of metal or plastics material and in the former case may be formed on or glued to, etc., the inner parts of the container. The window front 246 is cut out if the plastics material used is not itself transparent.

The container according to FIGS. 20 and 21 comprises an inner frame 260 made from transparent plastics material from the viewing side of which frame lateral bars 262 are formed at right-angles on all four edges. The sides facing one another of the lateral bars 262 are provided with serrated elements 264 parallel to the edges joined to the viewing plate.

An inserted pile 266 of photographs is pressed against the viewing plate by an outer frame 268 which fits in a complementary manner into the space enclosed by the lateral bars 262 and has serrated elements 274, complementary in shape to the serrated elements 264, provided on inner struts 270 which are formed on the pressure plate 272. As a result of the resilience of the materials used the serrated elements 264, 274 engage with one another and secure the position of the photographs pressed against the viewing plate, but may be disengaged by removing the outer frame from the inner frame. For aesthetic reasons, covering frame portions 276 are formed on the inner struts 270, also convering the bars 262 on the outside, which covering portions have at least two finger recesses 278 so that the inner frame can be gripped when pulling the parts apart.

This embodiment can be used not only as a container but also, at the same time, as a hanging frame or stand-up frame for a single photograph.

A lateral slot (not shown) may also be provided, if desired, for removing the pile. If desired, securing springs may be fitted as an alternative or in addition to the serrated elements 264, 274, which draw the parts towards one another.

In the seventh embodiment according to FIG. 22 and 23 a lid 286 is pivotally mounted at 284 to the housing 282 provided with a viewing window 280 (optionally closed by a plate), which lid can be locked by means of meshing locking elements 288, 290 in the closed position at the rear side of the housing. The inner side of the lid 286, facing the viewing aperture 280, bears a spring arrangement 292 which presses the pile 294 in the direction of the viewing aperture 280 when the lid 286 is closed; on opening the lid, however, the spring arrangement is pressed as a result of a sliding movement, against the edges 295 of the housing 282. The lid 286 cannot be completely opened but stops when the locking member 288 strikes against the inside of the housing; the photographs can however be easily inserted or removed in this position.

Figure 24:
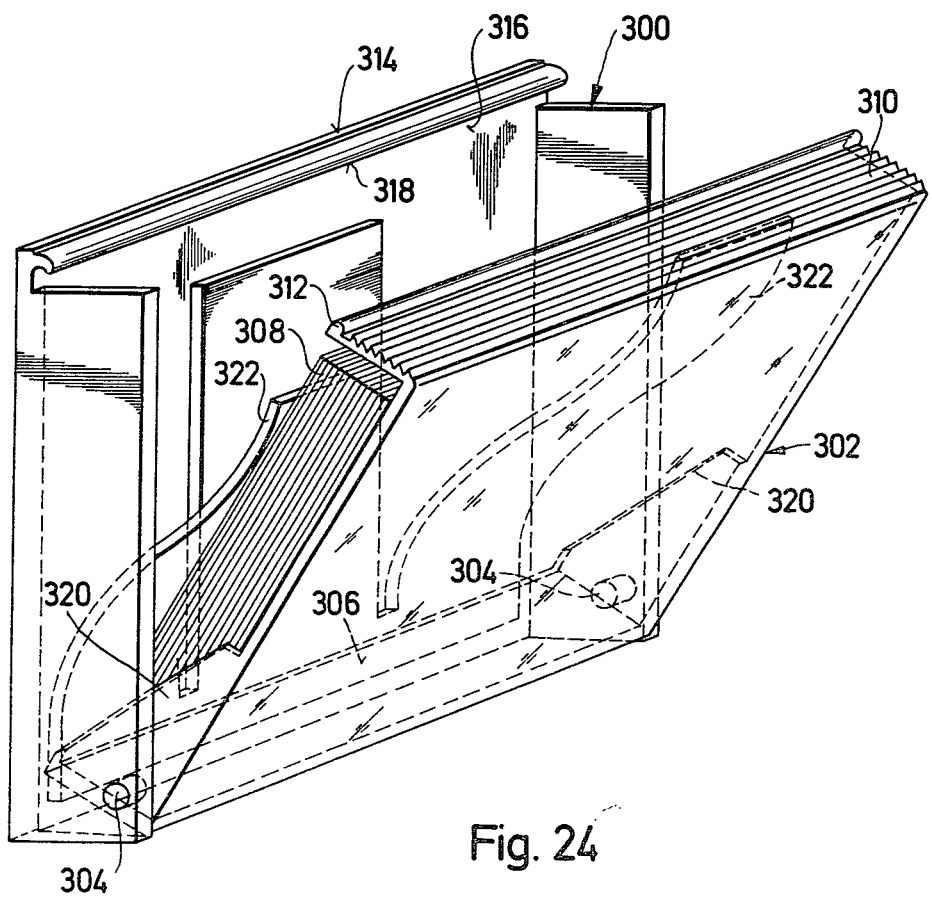
FIG. 24 is a perspective view of an eighth embodiment.

The container according to FIG. 24, the eighth embodiment, comprises a four-sided housing 300 in which a lid portion 302 consisting of transparent plastics material is hinged about pins 304. The lid portion 302 has a support face 306 on which a pile 308 of photographic prints is disposed, and a grip member 310 formed on the lid portion 302 opposite the support face 306. A locking rib 312 extends along the free edge of the grip member 310, complementary to which rib there is a locking groove 318 constructed near the upper edge 314 of the rear wall 316 of the housing 300. Reinforcing corners 320 join the support face 306 and the transparent front plate 320 of the lid portion 302. Springs 322 glued in, formed on or inserted in the housing press the pile 308 against the inner side of the lid portion 302 when the lid is pivoted into the housing and locked therein by rib 312 and groove 318. To open the container, the grip member 310 is pressed, the material of the lid portion 302 undergoing elastic deformation. It is generally sufficient for this grip to be constructed only on a part of the length of the lid portion 302, but the embodiment shown here is aesthetically more pleasing. When the grip member 310 is pressed the springs 322 assist the opening operation. The photographs can be inserted when the lid portion 302 is pivoted outwards through about 90°.

Figure 25:
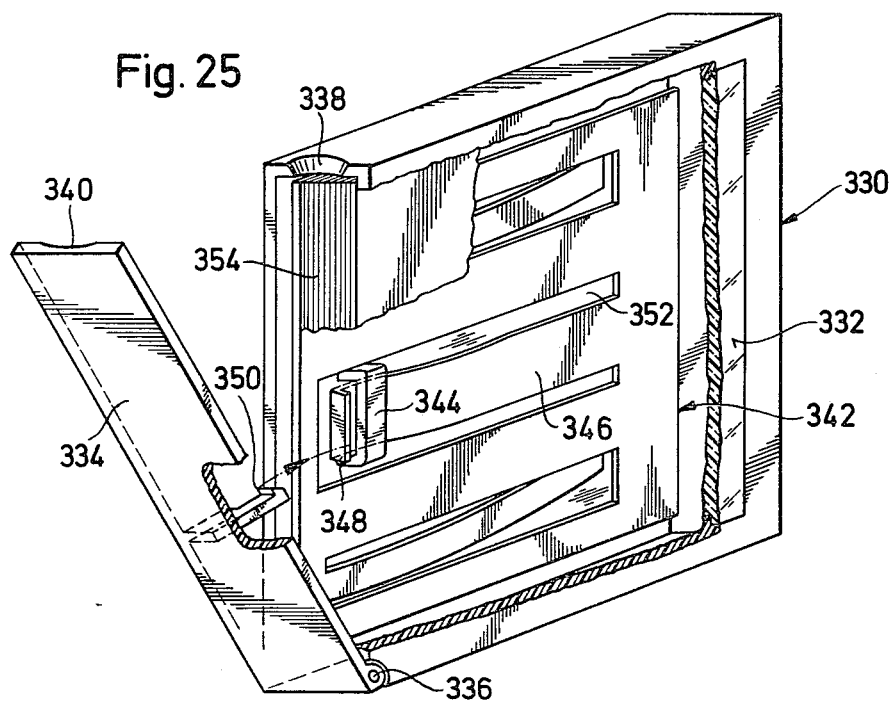
FIGS. 25 to 27 relate to a ninth embodiment with a perspective view, partly broken away, in FIG. 25, a sectional view in FIG. 26.
Figure 26:
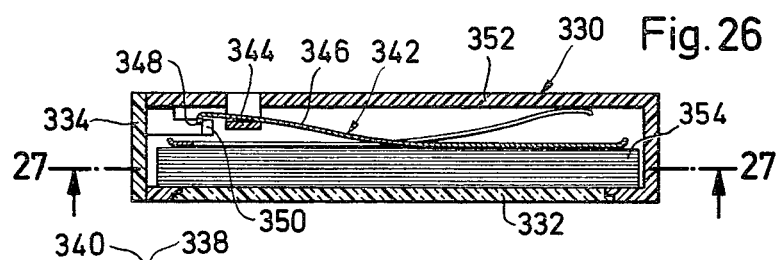
Figure 27:
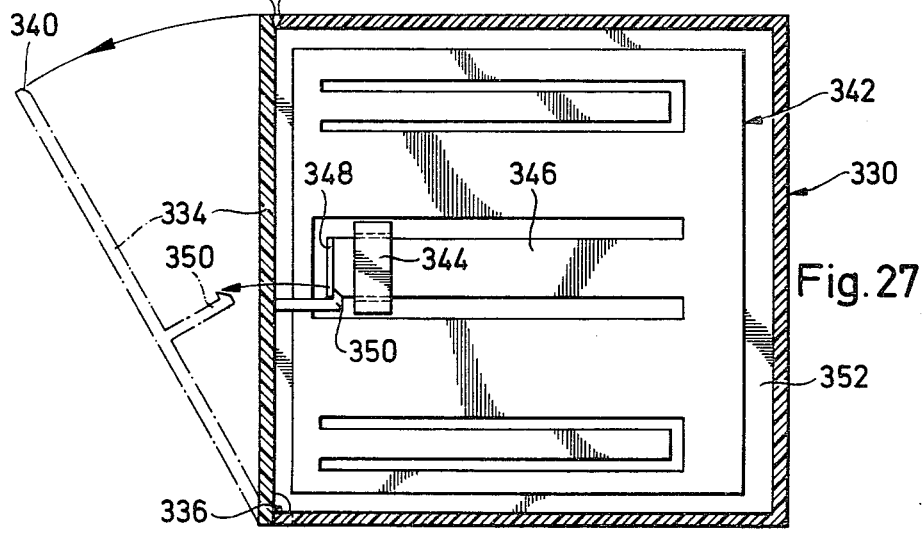

In the ninth embodiment according to FIGS. 25 to 27 the housing 330, having a glued-in transparent window 332, can be opened by a side lid 334, hinged at 336. Notches 338, 340 in the housing and in the lid respectively, provide a grip for opening the lid. On the side of the housing remote from the plate 332 there is a spring arrangement 342 which, apart from its dimensions, is in principle of the same construction as the spring arrangement in the embodiment shown in FIGS. 9 to 13. Accordingly, here too, the housing has a guide bridge 344 in which the central arm 346 of the spring arrangement is slidably displaceable and by means of which it can be either enabled or disabled. Here, however, the hook-like extension 348 on the spring arrangement is not anchored in the housing but is curved away therefrom and lies facing a hook 350 formed on the lid 334. In the closed state (FIG. 26) the hook 350 engages behind the hooked extension 348 and in this manner is held locked. If the lid is pulled at 340 it opens and the hook 350 draws the hook 348 and thus also the whole spring arrangement a little to the left (in FIG. 27), so that the spring is drawn into the bridge 344 and thus pressed against the rear side 352 of the housing. As a result of the arc-shaped travel of the lid 334 the hooks 350, 348 disengage after a certain distance, the lid can be completely opened (through about 90°) and a pile of photographs 354 can be inserted or removed. When closing the lid the hook 350 first pushes back the hook 348 so that the spring arrangement 342 once again presses the photographs against the viewing plate 332, then trips over the hooked extension 348 and holds the lid locked again.

In this embodiment the arrangement can also be such that the spring arrangement 342 in the rest position lies closely against the housing base 352 and is pressed inwards only by a stop on the lid corresponding to the hook 350 and is thus arched forwards towards the viewing plate 332. The lid would then be locked by a latching button or the like approximately where the notches 338, 340 are indicated.

The tenth embodiment according to FIGS. 28 and 29 comprises a housing 360 which is open at the large face opposite the viewing aperture 362. Parallel to this aperture guide grooves 364 for a slider member 366 are recessed into the housing, to which slider member a pressure spring 368 is attached. A pull 370 can be formed on the slider member. On the inside of the slider member, in front of the spring, there is a stop projection 372. After pulling the slider member (FIG. 29) the spring 368 lies outside the housing and a pile of photographs 374 can be inserted or removed. The complete removal of the slider member is prevented by the projection 372 which strikes against the edge of the slot in the housing through which the slider member 366 passes. This slot is nevertheless wide enough to permit also the spring 368 to pass through it insofar as the spring, as a result of being formed on in the plane of the slider member base, cannot occupy the same height as the slot.

When closing the lid the spring rises again and presses the pile 374 against the viewing aperture 362.

Figure 30:
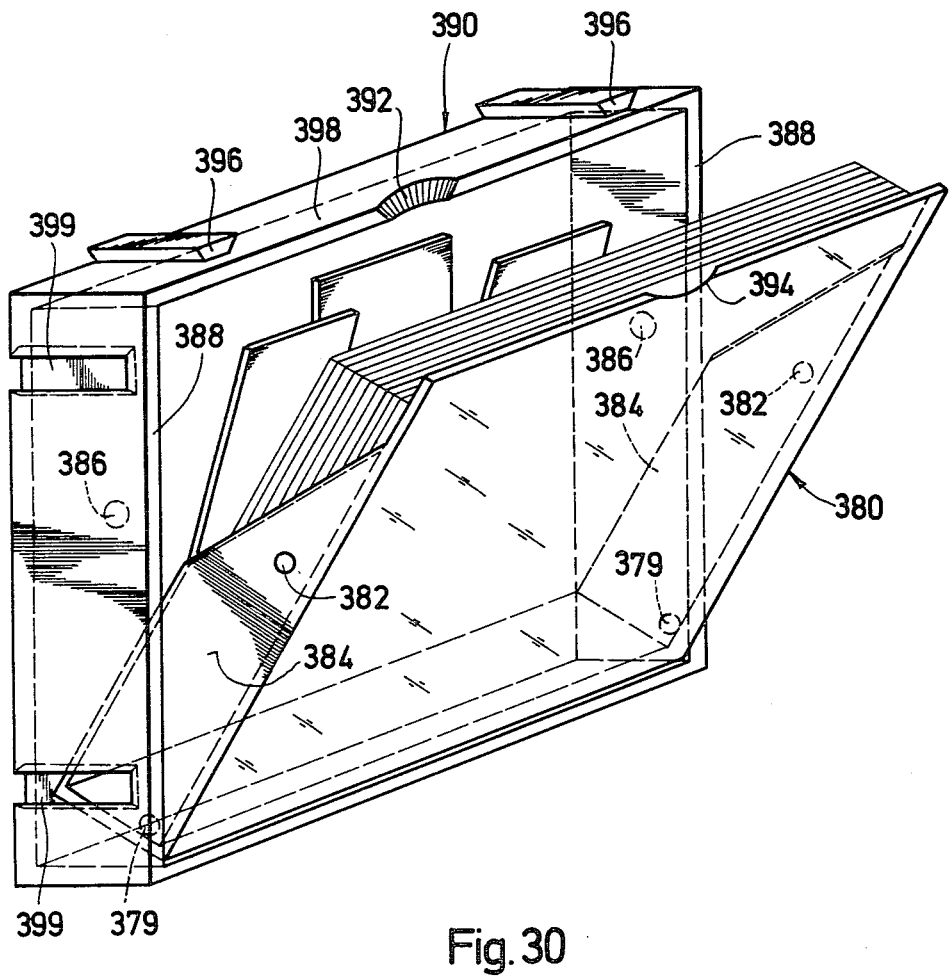
FIG. 30 is a perspective view of an eleventh embodiment.

The eleventh embodiment according to FIG. 30 is similar to the embodiment shown in FIG. 24. Here, however, the lid 380 is pivotable at 379 and is locked by means of resiliently engaging projections 382 on the side bars 384 of the lid and a complementary recess 386 in the side walls 388 of the housing 390. To open the container it is gripped by the notches 392 and 394 in the housing and the lid respectively.

Figure 31:
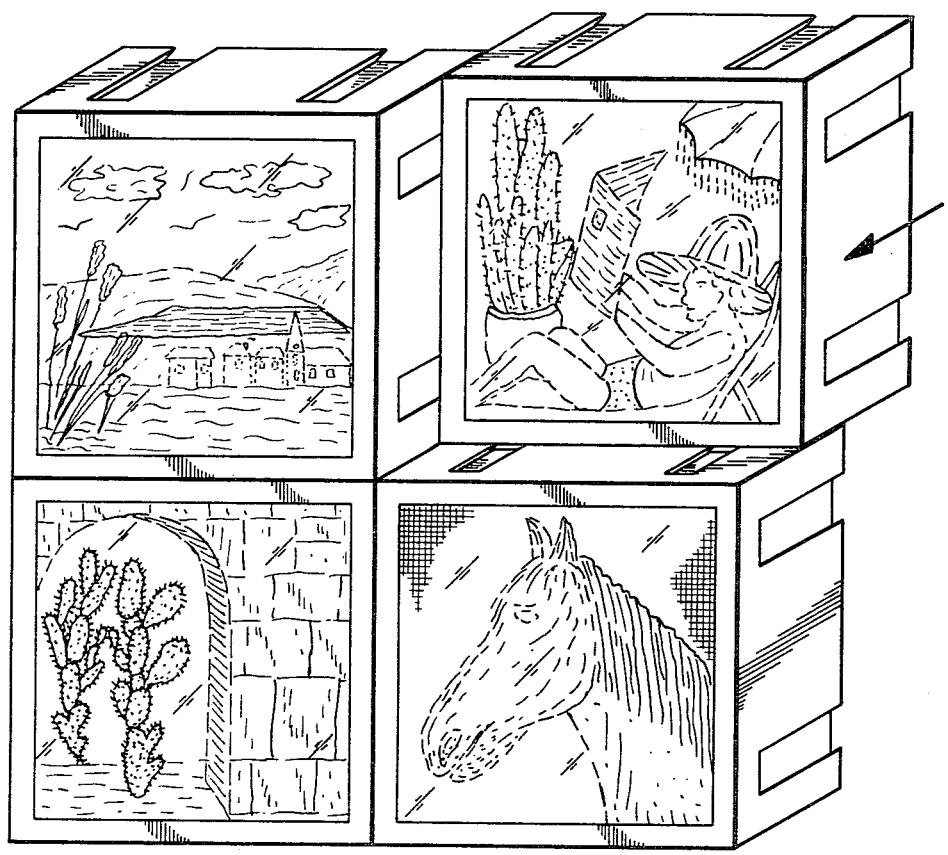
FIG. 31 is a perspective view of a variation of the possible ways of stacking.

In contrast to the embodiment shown in FIG. 24, this embodiment has the advantage that not only can stacking elements 396 be fitted to the sides 398 but stacking elements 399 can also be fitted to the sides 388 of the housing so that this embodiment is more favorable with regard to possible ways of stacking than the embodiment shown in FIG. 24 which can be stacked sideways only. In the other embodiments too, it is obvious to which faces of the container stacking elements can be fitted. Instead of direct stacking by means of meshing tongue and groove connections on the containers, additional stacking housings can also be used into which, for example, five or ten individual containers, for example, those shown in FIGS. 20 or 19, can be inserted and these approximately cube-shaped containers may themselves be provided with tongue and groove connections for stacking. Such an embodiment is shown in FIG. 31.

What is claimed is:

1. A container for accommodating a variable number of photographic prints, comprising enclosure means having a print compartment confining the prints in a pile and defining a viewing window through which a print is displayed, the enclosure also having operable means providing access into the print compartment for removing the pile of prints, and a backing device having print-engaging means in spaced and confronting relation with the window to confine the pile including a variable number of prints therebetween, the backing device also including variable means adjacent the compartment for variably changing the spacing between the print-engaging means and the window to lift and urge the pile toward the window and to urge the displayed print in the pile firmly against the window, said pile of pictures being loosened upon actuating of said operable means.

2. The container according to claim 1, wherein the operable means includes parts hinged together for providing access to the pile of prints to accommodate removal and replacement of the prints.

3. The container according to claim 1, wherein the operable means includes a slider for accommodating the prints, and a housing slidably receiving the slider therein.

4. A container according to claim 1, wherein the enclosure has a plurality of viewing windows.

5. A container according to claim 1, wherein the backing device includes a spring within the enclosure means.

6. A container according to claim 5, wherein the spring comprises a leaf spring secured to the enclosure means.

7. A container according to claim 4, wherein the backing device confronts and urges the prints toward all viewing windows.

8. A container according to claim 1, wherein the enclosure means includes a housing of integral construction and made of plastics material.

9. A container according to claim 8, wherein the housing includes a plurality of hinge parts hinged together to obtain access to the prints.

10. A container according to claim 3 wherein backing devices includes a pressure lever pivotally mounted in the housing and confronting the window to bear against the prints, and the pressure lever also having latching means engaging and retaining the slider in the housing.

11. A container according to claim 3, wherein the windows of the enclosure are disposed opposite each other, the slider moving between the windows, and the backing device being mounted on the slider to move between the two opposite viewing windows.

12. A container according to claim 1, wherein the enclosure means comprises an inner frame defining the viewing window and the backing device including an outer frame embracing the inner frame and having a backing wall confronting the viewing window, and the variable means comprising interlocking portions of the inner and outer frames and adjustable to several positions to provide various distances between the viewing window and the backing wall.

13. A container according to claim 12, wherein the interlocking portions include serrated elements engaging one another for locking.

14. A container according to claim 2, wherein the enclosure means include a hinged housing and lid, the lid having the backing device thereon, and the housing defining the viewing window.

15. A container according to claim 5, wherein the spring is a leaf spring and has one end slidable to release the print engaging means from the print, the enclosure having a housing with a lid attached to the spring for sliding the spring when the lid is removed, and a loop rigid with the housing and embracing the spring to guide the spring and print engaging means away from the window as the lid slides the spring during removal of the lid.

16. A container according to claim 2, wherein the hinged parts are the housing with the viewing window and the lid, and the lid having the backing device with spring means thereon to resiliently urge the prints toward the window.

17. A container according to claim 1, wherein the enclosure means has means interfitting with similar interfitting means of another enclosure.

18. A container according to claim 1, wherein the viewing window is glazed.

19. A container according to claim 1, wherein the enclosure means consists completely of injection moulded plastics parts.

20. A container for accommodating a variable number of photographic prints, comprising enclosure means having a print compartment confining the prints in a pile and defining a viewing window through which a print is displayed, the enclosure also having operable means providing access into the print compartment for removing the pile of prints, and a backing device having print-engaging means in spaced and confronting relation with the window to confine the prints therebetween, the backing device also including variable means adjacent the compartment for variably changing the spacing between the print-engaging means and the window to urge the displayed print in the pile firmly against the window, said pile of pictures being loosened upon actuating of said operable means, the operable means including a slider for accommodating the prints, and the enclosure means including a housing slidably receiving the slider therein, the backing device also including a spring within the enclosure means and being elongate and has a first end with said print-engaging means thereon, and has a second end anchored to the slider and extending in the direction of slider movement, a rigid loop on the bottom of the housing and slidably embracing the spring adjacent the second end thereof, movement of the slider drawing the spring through the loop to pull the print-engaging means away from the window and toward the bottom of the housing to release the prints for removal thereof.

21. A container for accommodating a variable number of photographic prints, comprising enclosure means having a print compartment confining the prints in a pile and defining a viewing window through which a print is displayed, the enclosure also having operable means providing access into the print compartment for removing the prints, and a backing device having print-engaging means in spaced and confronting relation with the window to confine the prints therebetween, the backing device also including variable means adjacent the compartment for variably changing the spacing between the print-engaging means and the window to urge the displayed print in the pile firmly against the window, said pile of pictures being loosened upon actuating of said operable means, the operable means including a slider for accommodating the prints, and the enclosure means including a housing slidably receiving the slider therein, the backing device including a spring within the enclosure means, the spring being elongate and extending in the direction of slider movement, the spring having a first portion anchored to the slider and a second portion with said print engaging means thereon, the second portion extending obliquely away from the window, and a stationary guide on the housing and overlying said oblique second portion of the spring to guide the second portion of the spring and the print-engaging means thereon away from the window as the slider is moved, to release the prints for removal thereof.

* * * * *